United States Patent
Rathmann

[15] 3,684,306
[45] Aug. 15, 1972

[54] STEERABLE TOBOGGAN

[72] Inventor: William G. Rathmann, 11712 S. Hawthorne Blvd., Hawthorne, Calif. 90250

[22] Filed: Dec. 31, 1970

[21] Appl. No.: 103,156

[52] U.S. Cl. ...................................................280/22
[51] Int. Cl. ........................B62b 13/08, B62b 17/00
[58] Field of Search...............280/16, 18, 19, 21, 22

[56] References Cited

UNITED STATES PATENTS

| | | | |
|---|---|---|---|
| 2,367,157 | 1/1945 | Tufts | 280/18 |
| 2,771,298 | 11/1956 | Crew | 280/16 |
| 2,469,765 | 5/1949 | Fish | 280/18 |
| 2,105,633 | 1/1938 | Bowen | 280/22 |
| 2,479,488 | 5/1949 | Warrender | 280/16 |
| 1,135,889 | 4/1915 | Fox | 280/22 |
| 1,489,289 | 4/1924 | Vogel | 280/16 |
| 1,938,701 | 12/1933 | Jones et al. | 280/21 R |
| 2,041,982 | 5/1936 | Doren et al. | 280/21 R |
| 2,592,397 | 4/1952 | Dubbs | 280/16 |
| 2,862,719 | 12/1958 | Morz | 280/16 |

*Primary Examiner*—Benjamin Hersh
*Assistant Examiner*—Robert R. Song
*Attorney*—Donald Diamond

[57] ABSTRACT

In a pivotally connected, two-piece steerable toboggan having front and back sections, improved steering characteristics are obtained by locating the pivotal connection for the sections within the front half of the flat portion of the front section and substantially intermediate to the sides thereof.

13 Claims, 5 Drawing Figures

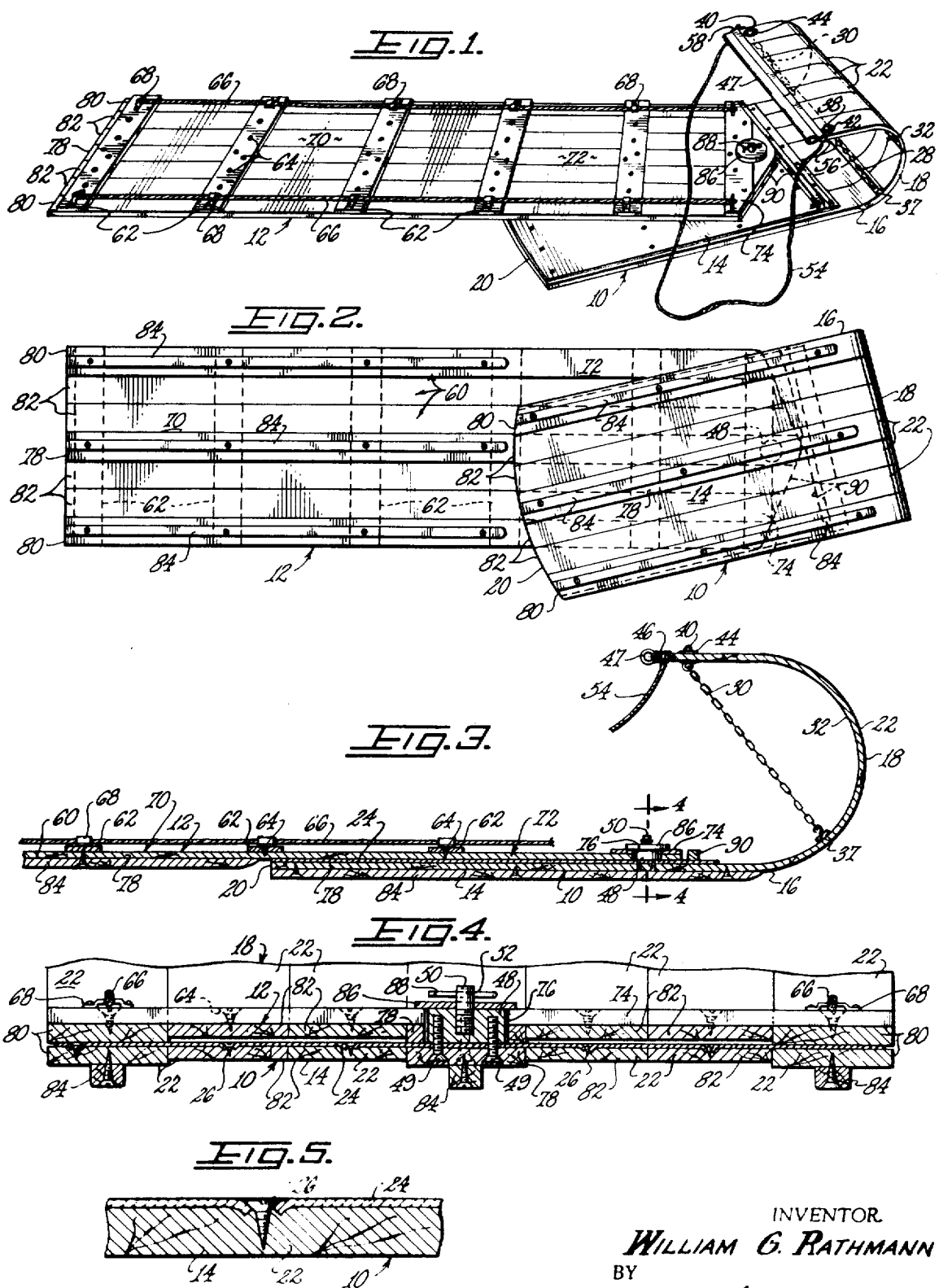

STEERABLE TOBOGGAN

BACKGROUND OF THE INVENTION

This invention relates to toboggans and, more particularly, to improved, pivotally connected, two piece steerable toboggans.

A toboggan is used in the winter sport of coasting on snow and is made of adjacent flexible strips of hickory, ash, maple, or oak with the front ends curved back. Spaced, cross-pieces are attached to the flexible strips for holding the strips together in a single compact unit. The typical, single unit toboggan is usually about 6 to 8 feet long and about 1.5 feet wide.

The conventional toboggan has been somewhat dangerous to use under certain circumstances because of the inability to steer it. Thus, on crowded slopes or toboggan slides, collisions are frequent and accidents, sometimes of a serious nature, occur when a toboggan veers off the course intended to be followed and encounters deep pits or other hazards.

PRIOR ART

It has heretofore been suggested that the aforesaid problems can be overcome by using a pivotally connected, two-piece toboggan which is capable of being steered or directed in its descent along a slope or slide. In U.S. Pat. No. 2,367,157–Tufts, there is disclosed a two-piece toboggan having a forward section and a rear section. The front end of the rear section overlaps the rear end of the front section by about 6 inches and the sections are pivotally connected in the area of overlap. Steering is theoretically effected by projecting one's weight toward the side of the toboggan forming the inside of the turn.

U.S. Pat. No. 2,862,719–Morz discloses a two-piece snow sled having a front section and a rear section disposed in tandem relation. The front end of the rear section overlaps the rear end of the front section and the sections are pivotally connected in the area of overlap by a universal joint. The operator of the sled sits on a seat attached to the rear section and effects steering by applying appropriate foot pressure to heel rests located at the forward end of the toboggan.

The pivotally connected, two-piece steerable toboggan of the prior art has several inherent disadvantages. For example, the steering portion is far ahead of the pivot means which would allow the front portion or steering portion to turn too easily. Moreover, once this toboggan has attained speed, it would take more than moderate force to bring the front section back into alignment with the rear section after turning because of the location of the pivot means with respect to the location of the steering force. Also, since the prior art toboggan is designed in two sections that can flex on each other in the vertical direction, the two sections could be torn apart by adverse leverage developed by weight in the center and at each end of the toboggan. In addition, the prior art steerable toboggan cannot be used for carrying straight objects extending the length of the toboggan and still permit turning capabilities.

OBJECTS

Accordingly, an object of this invention is to provide a new and improved pivotally connected, two-piece steerable toboggan.

Another object of this invention is to provide a toboggan of the character described wherein the pivotal connection for the front and rear section is, substantially, in vertical alignment with the rear terminus of the curved portion of the front section whereby improved steering characteristics are imparted to the toboggan.

A further object of this invention is to provide a toboggan of the character described wherein the carrying portion is a single section.

A still further object of this invention is to provide a toboggan of the character described wherein a bearing plate overlies and is attached to substantially all of the flat portion of the front section to impart improved structural characteristics to the toboggan and to form a bearing surface between the coextensive portions of the back and front sections.

Yet another object of this invention is to provide a toboggan of the character described which is easy to manufacture, quickly assembled and disassembled, capable of long extended usage without mechanical breakdown, and is otherwise ideally suited to its intended purpose.

SUMMARY OF THE INVENTION

In accordance with this invention, there is provided a pivotally connected, two-piece steerable toboggan which includes a front section and a back section. The front and back sections have substantially the same lateral width and each of the sections terminates in sides which are substantially parallel. The front section includes a flat portion which is integral at its front end with an upwardly and backwardly extending curved portion. The back section includes a forward portion and a rearward portion and terminates at its forward end in a front end portion.

The forward portion of the back section overlies the flat portion of the front section with the front end portion of the back section being within the front half of the flat portion but sufficiently spaced from the curved portion to permit up to 180° rotational movement. Means, located substantially intermediate to the sides of the toboggan are provided for pivotally connecting the front end portion of the back section with the flat portion of the front section. A stop can be attached to the front section for limiting the pivotal rotation of this section with respect to the back section.

A bearing plate advantageously overlies and is attached to substantially all of the flat portion of the front section to impart improved structural characteristics to the toboggan and to provide a bearing surface between the coextensive portions of the front and back sections.

The pivot means includes a releasable locking device which maintains the front and back sections in engageable relationship and which permits rapid assembly and disassembly of the two sections.

Spaced, longitudinally extending shallow runners are attached to the underside of the front and back portion to facilitate steering and stability of the toboggan.

Steering of the toboggan is effected by applying appropriate foot pressure to the forward end of the toboggan or by pulling on a rope the ends of which are connected to clamps which are attached to the sides of the toboggan adjacent the rear terminus of the curved portion.

DESCRIPTION OF THE DRAWINGS

FIG. 1 is a perspective view of the pivotally connected, twocpiece steerable toboggan.

FIG. 2 is a bottom plan view of the toboggan.

FIG. 3 is a longitudinal section along a line substantially intermediate to the sides of the toboggan.

FIG. 4 is a transverse section along line 4—4 of Fig. 3 looking in the direction of the forward end of the toboggan.

FIG. 5 illustrates to use of a counter-sunk flat-head screw for attaching a bearing plate to the flat portion of the front section of the toboggan.

DETAILED DESCRIPTION

Referring to FIG. 1, the steerable toboggan comprises a front section 10 and a back section 12. The front section includes a substantially flat portion 14 which is integral at its front end 16 with an upwardly and backwardly extending curved portion 18. The rearward end 20 of the flat portion 14 is preferably curved.

Although the front section can be fabricated from plastic or metal sheet in accordance with methods and procedures well-known in the art, it, preferably, comprises a plurality of adjacently disposed and longitudinally extending flexible strips 22 as, for example, strips of oak which are bent up and back at their front end 16 to form the curved portion 18 of the front section.

A bearing plate 24 which can be made from stainless steel or aluminum overlies and is attached to substantially all of the flat portion 14 of the front section by means of counter-sunk flat head threaded fasteners 26 as illustrated in FIG. 5. The attached bearing plate maintains the flexible strips in fixed, adjacent position, imparts increased structural strength to the toboggan and provides a bearing surface between the coextensive portions of the front and back sections.

Chains 28, 30 are mounted across the inside curvature 32 of the curved portion and adjacent to the lateral sides of this portion for maintaining the forward end of the flexible strips in a curved position. The oppositely disposed chains are connected at one end to a cross-strip 37 which is attached, transversely, to the lower portion of the inside curvature of the front section. The chains are connected at their other end to brackets 38, 40 which extend through eyelets 42, 44 in the top of the curved portion adjacent to its rear terminus 46. A cylindrically shaped capping member 47 is attached to the rear terminus 46 of the curved portion which terminus is in a vertical plane rearwardly adjacent to the vertical plane which passes through the front end 16 of the flat portion.

A pivotal member in the form of a cylindrical hub 48 is mounted on the bearing plate 24 in substantial vertical alignment with the rear terminus 46 of the curved portion 18 and substantially intermediate to the sides of the front portion. The cylindrical hub is attached to the flat portion 14 of the front section 10 by means of counter-sunk, flat head threaded fasteners 49 which extend into the hub from the bottom of the flat portion. Although this pivotal member is preferably located in vertical alignment with the rear terminus of the curved portion, it can advantageously be positioned within the front half of the flat portion but should be sufficiently spaced from the inside curvature of the curved portion to permit up to 180° pivotal rotation between the front and back sections. However, improved steering characteristics are obtained when the pivotal member is located within the front one-fourth of the flat portion. A rod 50 extends upwardly from the cylindrical hub. The rod is threadedly attached at its lower end to the hub and is provided with a transverse opening 52 at its upper end.

The ends of a steering rope 54 are attached to brackets 56, 58 which are connected to the sides of the front section adjacent to the rear terminus 46 of the curved portion.

Although the back section 12, like the front section 10, can be fabricated from plastic or metal sheet, it, preferably, comprises a plurality of adjacent flexible strips 60 as, for example, strips of oak. Spaced, cross-strips 62 are attached to the flexible strips by means of appropriate threaded fasteners 64 for maintaining the flexible strips in a single, compact unit. Safety ropes 66 extend substantially the full length of the back section and are held in position by brackets 68 attached to the cross-strips 62 adjacent their lateral ends.

The back section includes a rearward portion 70 and a forward portion 72 with the forward portion terminating in a front end portion 74. The front end portion, which consists of a cross-strip transversely attached to the forward end of the longitudinal strips, is provided with a cylindrical opening 76 which is located substantially intermediate to the sides of this portion and which is adapted to pivotally engage the cylindrical hub 48 of the front section. The diameter of the cylindrical opening is, preferably, about one-fourth inch larger than the diameter of the cylindrical hub.

The front and back sections of the toboggan have substantially the same lateral width and each section terminates in lateral sides which are substantially parallel.

As shown in FIG. 1, each section has seven longitudinally extending flexible strips. The middle strips 78 and the outer strips 80 of each section are somewhat thicker than the intervening strips 82 as shown in FIG. 4. Shallow runners 84 are attached to the bottom side of the middle and outer strips of the rearward portion of the back section and the flat portion of the front section.

The front and rear sections are assembled into a steerable toboggan by placing the forward portion of the back section over the flat portion of the front section such that the cylindrical opening 76 in the front end portion 74 pivotally engages the cylindrical hub 48 of the front section. A washer 86 of appropriate size is placed over the rod 50 which extends through the cylindrical opening 76. A removable cotter pin 88 is inserted into the transverse opening 52 of the rod to provide a releasable locking device for maintaining the front and back sections in engageable relationship. The transverse opening in the rod is sufficiently spaced from the top of the front end portion to permit limited vertical movement between the sections. Thus, the sections can be easily and quickly assembled for use or disassembled for carrying or storage. The cotter pin and washer are advantageously attached to chains which are connected to the front end portion of the back section in order to minimize the possibility of loss or misplacement of such. Preferably, the toboggan is designed such that the rearward portion 70 of the back section 12 comprises from about two-thirds to three-fourths of the length of this section.

Steering is effected by pulling the steering rope 54 in the direction of the desired turn or by applying appropriate foot pressure to the front end of the toboggan. Upon release of the steering force, the front section, because of the location of the pivot means, will tend to realign itself with the back section. A stop 90 can be attached to the front section for limiting the pivotal rotation of this section with respect to the back section.

Thus, the objects of this invention have been accomplished, namely, in a two-piece, pivotally connected steerable toboggan having front and back sections, improved steering characteristics are obtained by locating the pivotal connection for the sections within the front half of the flat portion of the front section substantially intermediate to the sides thereof.

While in the foregoing drawing and description there has been shown and described the preferred embodiment of the invention, it will be understood, of course, that minor changes may be made in the combination and arrangement of parts without departing from the spirit and scope of the invention as claimed.

I claim:

1. A pivotally connected, two piece steerable toboggan comprising:

a front section and a back section, front and back sections having substantially the same lateral width and each of said sections terminating in lateral sides which are substantially parallel, said front section including a substantially flat portion having a front end and a rear end with the front end being integral with an upwardly and backwardly extending curved portion having a rearward terminus, said back section having a forward portion and a rearward portion and terminating at its forward end in a front end portion, said forward portion of the back section overlying the flat portion of the front section with the front end portion of said back section being within the front half of said flat portion but sufficiently spaced from said curved portion to permit up to 180 degree rotational movement, and means located substantially intermediate to the sides of the toboggan for pivotally connecting the front end portion of the back section to the flat portion of the front section.

2. A steerable toboggan according to claim 1 wherein a bearing plate overlies and is attached to substantially all of the flat portion of the front section.

3. A steerable toboggan according to claim 2 wherein said flat portion and integral curve portion comprise a plurality of adjacently disposed, longitudinally extending, flexible strips having their front end portion bent up and back to form said curved portion and including means for maintaining said front end portion in a curved position.

4. A steerable toboggan according to claim 3 wherein said back section comprises a plurality of adjacently disposed, longitudinally extending, flexible strips held in substantially fixed position by spaced, cross-strips attached thereto.

5. A steerable toboggan according to claim 4 wherein the means for pivotally connecting the front and back sections comprises a cylindrical member mounted on said bearing surface and attached to said flat portion and disposed within a relatively enlarged corresponding opening in the front end portion of said back section, said pivotal connection means including releasable locking means for maintaining the front end portion of the back section and the flat portion of the front section in engageable relationship.

6. A steerable toboggan according to claim 5 wherein the releasable locking means comprises a rod attached at one end to said cylindrical member and extending upwardly through the opening in the front portion of the back section, said rod being provided with a transverse opening substantially adjacent to the upper side of said front end portion, and a releasable locking pin engaging the transverse opening in said rod.

7. A steerable toboggan according to claim 6 wherein the rearward terminus of the curved portion is in a plane which is rearwardly adjacent to the vertical plane which passes through the front end of the flat portion.

8. A steerable toboggan according to claim 7 wherein the pivotal connecting means and the terminus of the curved portion are in substantial vertical alignment.

9. A steerable toboggan according to claim 8 wherein the underside of the rearward portion of the back section and the underside of the flat portion of the front section are provided with a plurality of spaced, longitudinally extending runners.

10. A steerable toboggan according to claim 9 wherein first and second clamps are attached to the right and left hand sides of the toboggan adjacent the terminus of the curved portion, respectively, for attaching rope means for selectively steering said front section in a right or left-hand direction.

11. A steerable toboggan according to claim 10 wherein the front section is provided with means for limiting the pivotal rotation of the front section with respect to the back section.

12. A steerable toboggan according to claim 1 wherein the front end portion of the back section is within the front one-fourth of the flat portion of the front section.

13. A pivotally connected, two piece steerable toboggan comprising:

a front section and a back section;

said front and back sections having substantially the same lateral width and each of said sections terminating in lateral sides which are substantially parallel;

said front section including a substantially flat portion having a front end and a rear end with the front end being integral with an upwardly and outwardly extending portion;

said back section having a forward portion and a rearward portion and terminating at its forward end in a front end portion;

said forward portion of the back section overlying the flat portion of the front section with the front end portion of said back section being within the front half of said flat portion but sufficiently spaced from said curved portion to permit up to 180° rotational movement; and means located substantially intermediate to the sides of the toboggan for pivotally connecting the front end portion of the back section to the flat portion of the front section.

* * * * *